Dec. 30, 1930.     J. A. LAIRD     1,786,661
COTTON CHOPPER
Filed July 2, 1929    2 Sheets-Sheet 1
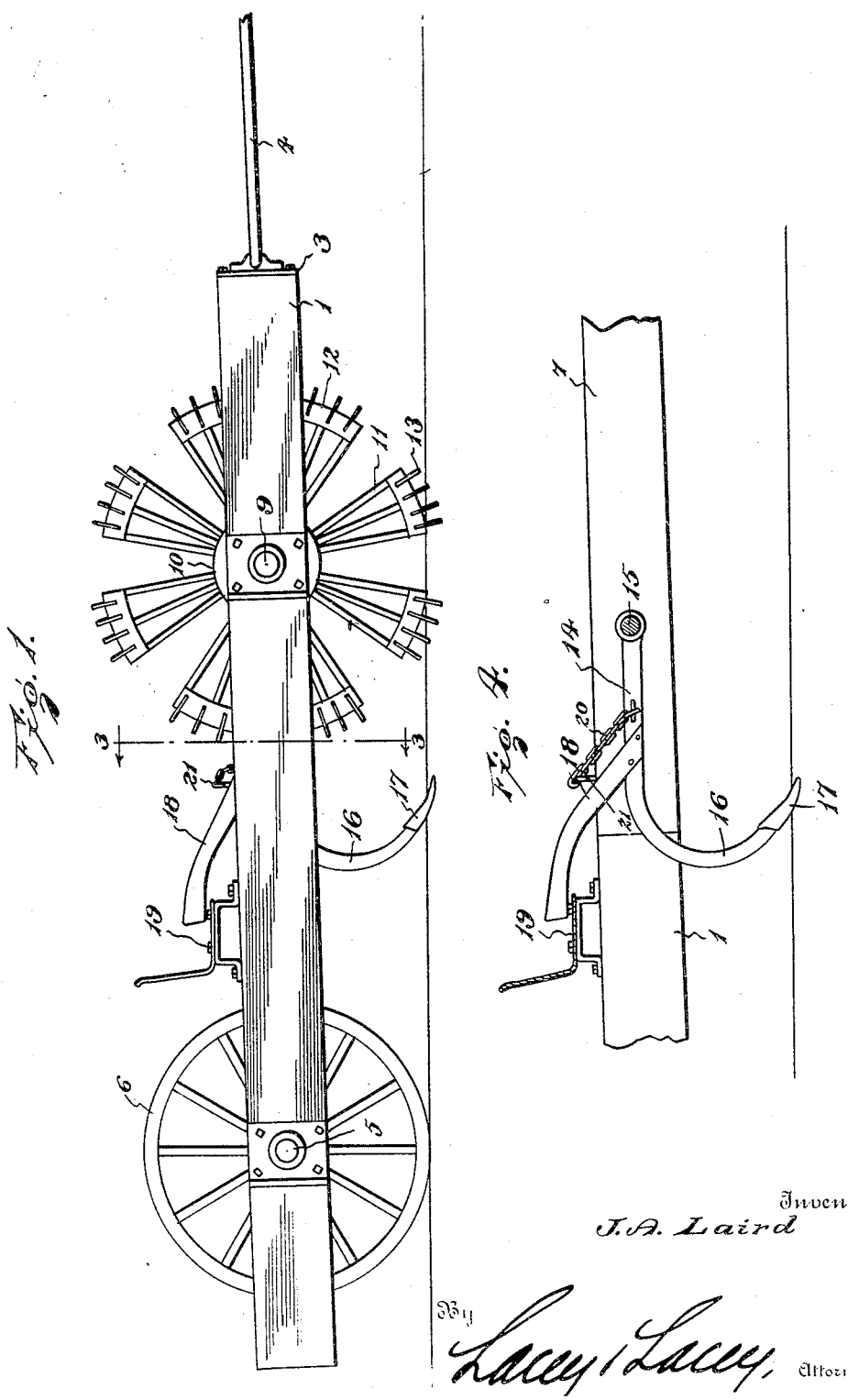
Inventor
J. A. Laird
By
Lacey & Lacey, Attorneys Dec. 30, 1930.  J. A. LAIRD  1,786,661
COTTON CHOPPER
Filed July 2, 1929  2 Sheets-Sheet 2
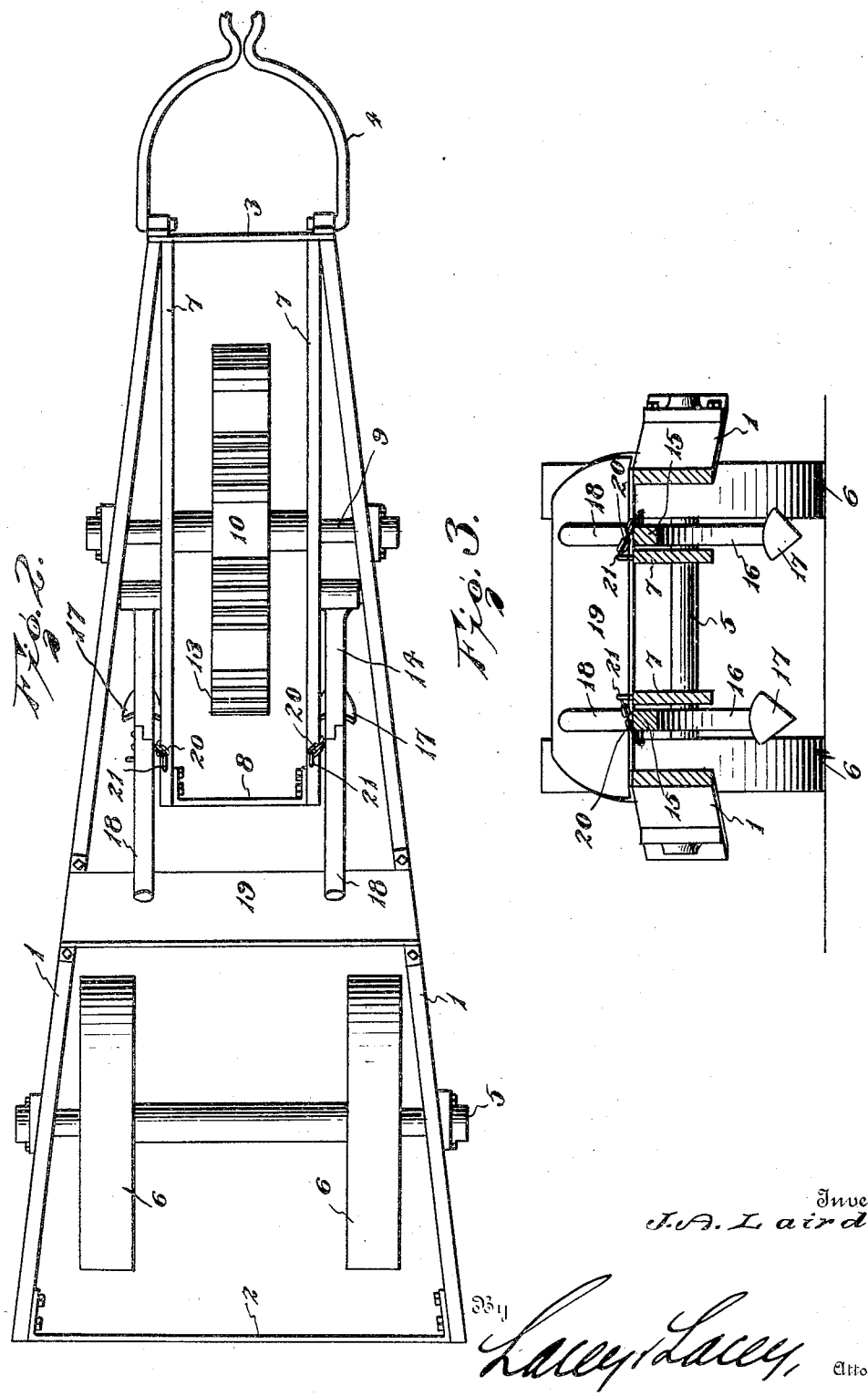
Inventor
J. A. Laird
By Lacey & Lacey, Attorneys Patented Dec. 30, 1930

1,786,661

UNITED STATES PATENT OFFICE

JAMES A. LAIRD, OF HUNTINGTON, TEXAS, ASSIGNOR OF TEN PER CENT TO R. A. COURTNEY, OF LUFKIN, TEXAS

COTTON CHOPPER

Application filed July 2, 1929. Serial No. 375,431.

This invention has for its object the provision of an inexpensive efficient cotton chopper of light draft which will operate automatically as it is drawn along the row of plants. The invention is illustrated in the accompanying drawings and will be hereinafter first fully described and then particularly defined in the appended claims.

In the drawings:

Figure 1 is a side elevation of a cotton chopper embodying the present invention, Fig. 2 is a top plan view of the same, Fig. 3 is a transverse section on the line 3—3 of Fig. 1, and Fig. 4 is a detail of one of the covering plows.

In carrying out the present invention, there is provided a frame consisting of side bars 1 which converge toward their forward ends and have their rear ends connected rigidly by a cross bar 2. The front ends of the side bars are preferably likewise connected by a cross bar 3 and to the front ends of the side bars are attached a draft device 4 of any approved form. Near the rear ends of the side bars, an axle 5 is journaled therein and upon said axle are secured ground wheels 6 which are spaced apart and located near the ends of the axle so as to be disposed adjacent the side bars but at the inner sides of the same. This arrangement will provide ample clearance between the wheels for the row of plants so that there will be no crushing of the plants which are to be left standing. An inner frame consisting of side bars 7 is connected at its front end with the front ends of the side bars 1 and includes a cross bar 8 rigidly connecting the rear ends of said side bars. Extending through and journaled in the bars 1 and 7 is an an axle 9 to which is secured a hub 10 from which radiate groups of spokes 11 having their outer ends connected by rim members 12, knives 13 being carried by said beams, as shown clearly in Fig. 1. The knives are illustrated as being set in transverse grooves in the rim members but the exact manner of securing the knives is immaterial, it being preferred, however, that they be held by some means which will be secure but permit their ready removal when they may be broken or become so worn as to be unfit for further use. It will be noted particularly upon reference to Fig. 1 that the blades are adapted to penetrate the soil and thereby impart rotation to the chopping wheel and when two successive groups of blades and spokes are presented to the ridge of plants, the space between said groups will bridge the plants which are to be left standing while the blades and rim members of the groups will cut through and crush the other plants so that the crop will be thinned out as required.

It will be understood that, inasmuch as the axles 9 are journaled in both the inner and the outer frames and the front ends of said frames are connected, the inner frame will not be permitted to drop from its position relative to the outer frame. Disposed between each side bar 1 and the adjacent side bar 7 is a plow beam 14 which is mounted at its front end upon a rod or bolt 15 fitted at its ends in the adjacent bars 1 and 7. The beam extends rearwardly from its pivotal support and then extends downwardly to form a standard 16 on the lower end of which is secured a shovel plow or coverer 17 which will turn the loose soil up around the standing plants as the machine is drawn along the row. Secured to each beam 14 is a handle 18 which extends upwardly and rearwardly to within convenient reach of a driver upon the seat 19 which is secured upon the side bars 1 and bridges the same in advance of the ground wheel 6 and at the rear of the inner frame. Chains or like connections 20 are provided between the beams 15 and the side bars 7 so that, if desired, the beams may be raised to an inoperative position and held in such position by engaging hooks 21 on the beams 7 in proper links of the chains. The plows may be easily raised by merely lifting upon the handles 18 and this facility of adjustment is advantageous when turning the machine at the end of a row or when moving it from field to field.

It will be readily noted that I have provided an exceedingly simple device which may be produced at a low cost. The machine may be very easily drawn along a row of plants and easily guided so that the chopping wheel will run on the ridge of the row and the coverers or cultivating plows run at the sides of the row to turn the loose dirt up around the plants which are left standing to protect the same and promote their growth. The chopping wheel is rotated by reason of its tractive engagement with the soil and as it is of an open-frame construction the loose dirt may be very readily discharged therefrom as the wheel rotates.

Having thus described the invention, I claim:

1. A cotton chopper comprising a frame, ground wheels supporting the rear end of the frame, a topping wheel supporting the front end of the frame and rotated by its tractive engagement with the ground, an inner frame between the sides of which the chopping wheel is mounted, and coverers pivotally mounted between the inner and outer frames and arranged to travel along the ground at the rear of the chopping wheel.

2. A cotton chopper comprising an outer frame, ground wheels supporting the rear end of the frame, a seat secured upon the frame in advance of the ground wheels, an inner frame connected to the front end of the outer frame, an axle journaled in the inner and the outer frame and extending transversely through the same, a chopping wheel carried by said axle, covering plows pivotally mounted between the inner and the outer frames and mounted to travel at the rear of the chopping wheel, handles rising from the covering plows adjacent the seat, and fastening connections between the covering plows and the inner frame.

In testimony whereof I affix my signature.

JAMES A. LAIRD. [L. S.]